F. KARSCHITZ.
ADJUSTABLE HOLDER.
APPLICATION FILED APR. 25, 1921.
1,397,254.
Patented Nov. 15, 1921.
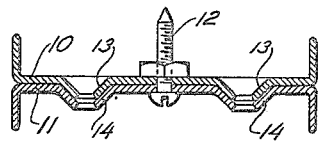
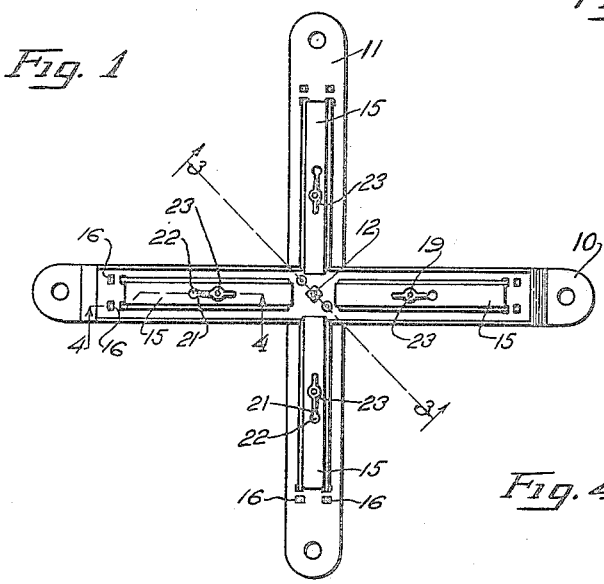
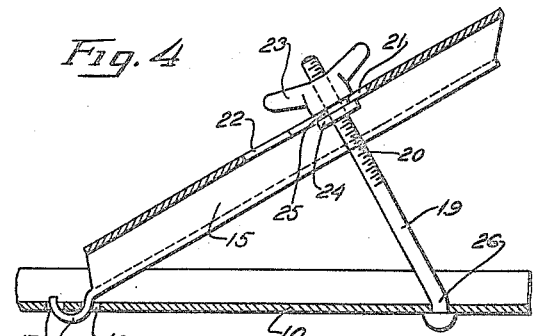
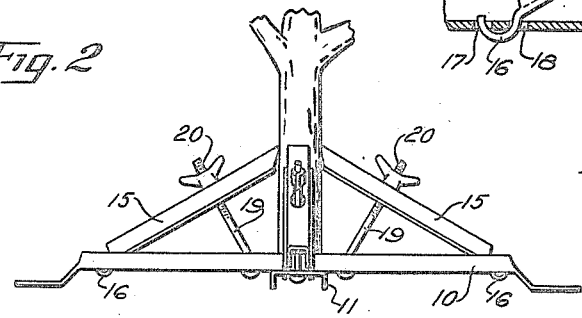
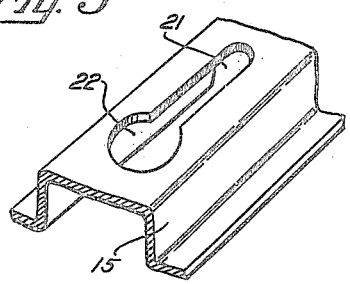
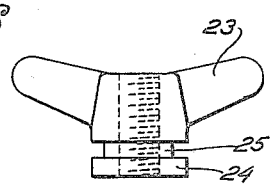
INVENTOR.
Frank Karschitz
BY
G. H. Braddock
ATTORNEY.

UNITED STATES PATENT OFFICE.

FRANK KARSCHITZ, OF BRIDGEPORT, CONNECTICUT.

ADJUSTABLE HOLDER.

1,397,254.      Specification of Letters Patent.      Patented Nov. 15, 1921.

Application filed April 25, 1921. Serial No. 464,425.

*To all whom it may concern:*

Be it known that I, FRANK KARSCHITZ, a citizen of Hungary, and resident of Bridgeport, in the county of Fairfield and State of Connecticut, have invented certain new and useful Improvements in Adjustable Holders, of which the following is a specification.

This invention relates to an adjustable holder for Christmas trees and the like.

The principal object of the invention is to produce a holder of the present character which will be an improvement generally over those heretofore known.

Further important objects are to provide a holder having novelly constructed base plates equipped with substantial and dependable coöperating means for insuring the fixed relation of the base plates; and to provide novelly constructed side braces and improved means whereby the same can be manipulated to clamp a tree or the like in the holder.

With the above and other objects in view, the invention comprises the construction, arrangement and combination of parts as now to be fully described and hereinafter specifically claimed, it being understood that such changes in details of construction and arrangement of parts may be made as fall within the spirit of the invention and the scope of the claims.

In the accompanying drawing forming a part of this specification,

Figure 1 is a top plan view of the adjustable holder;

Fig. 2 is a side elevational view thereof, showing a part of a tree or the like as when clamped in position;

Fig. 3 is a sectional view, on an enlarged scale, on line 3—3 in Fig. 1, looking in the direction of the arrows;

Fig. 4 is a sectional view, on an enlarged scale, on line 4—4 in Fig. 1, looking in the direction of the arrows;

Fig. 5 is a detail perspective view, on an enlarged scale, of a portion of one of the side braces; and Fig. 6 is an elevational view, on an enlarged scale, of one of the nuts used for adjusting the side braces.

The holder of the invention consists of several metallic elements so constructed that they can be readily assembled to produce the holder or taken apart to occupy but little space.

Referring to the drawing, 10 and 11 denote, respectively, base plates secured together at their midlengths as by means of a pointed bolt 12. The base plates are preferably disposed at right-angles to each other and to maintain their fixed relation each is preferably drawn, as more clearly disclosed in Fig. 3, to provide interengaging protuberances 13 and 14 projecting from the bodies of the base plates and properly proportioned to snugly fit one within the other when the base plates are engaging each other. Any number of these protuberances may be employed. As shown, I preferably provide each base plate with two protuberances and arrange the same at opposite sides of bolt 12. The protuberances are of sufficient size to provide a substantial holding means for the base plates and it is evident that when the nut upon the bolt is fastened down said protuberances cannot become disengaged.

Duplicate adjustable side braces 15, hingedly supported upon the base plates, are for the purpose of fastening down trees or the like the bases of which vary in diameter. As very clearly shown, each side brace consists of a strip of channel iron the inner end of which is adapted to bear against a tree or the like to be supported and the outer end of which is provided with one or more projections desirably taking the form of hooks, denoted by 16, extending substantially in the plane of the side braces and constituting the means whereby the side braces are hingedly supported upon the base plates. I preferably provide each side brace with two such hooks and arrange the same in spaced apart relation, as better disclosed in Fig. 1. To accommodate the hooks the base plates are provided with alining holes, denoted by 17 and 18, two for each hook, and the hooks are of sufficient length to extend through both holes to terminate at or above the upper faces of the base plates when the side braces are at or near the approximate positions they may occupy when in use. In setting up the side braces the hooks are first made to enter the inner holes 18 and the inner ends of the side braces are then swung downwardly to cause the extremities of the hooks to enter and pass through the outer holes 17. It will be at once obvious that the side braces will be thus hingedly connected to the base plates and can be swung through a considerable arc without the possibility of becoming accidentally removed. By reversing the setting up operation the side braces can be removed from the base plates. It is to be here remarked that the hinge arrangement just described is well adapted to its purpose. It makes possible the use of simply constructed elements and at the same time serves the useful functions (1) of allowing free swinging movement of each side brace, and (2) of providing substantial and dependable means for bracing the outer ends of the side braces, it being understood that said outer ends are at all times contiguous with or closely adjacent to the upper faces of the base plates.

Mechanism is provided for adjusting each side brace on its hinge. This mechanism in the instance of each side brace is identical. A floating bolt 19 arranged in a base plate has its threaded portion 20 extending freely through a longitudinal slot 21 in the side brace and said slot is provided at its outer end with an enlarged portion 22. A nut 23, adapted to engage the thread of the bolt, has an annular shoulder 24 of a diameter a trifle less than the diameter of enlarged portion 22 but greater than the width of slot 21, and a reduced portion 25 of a diameter approximately equal to the width of said slot 21 and of a length approximately equal to the thickness of the side brace.

In setting up the holder the floating bolts are arranged so that their threaded portions extend through the enlarged portions of the longitudinal slots and the nuts are turned on the bolts until their reduced portions aline with the slots. The bolts are then swung slightly inwardly until the reduced portions of the nuts engage the walls of the elongated slots, as will be understood. Any suitable means may be provided for holding the bolts in the base plates. As shown, I prefer to bend the bolts slightly as indicated more clearly at 26 in Fig. 4 to accomplish this end. It will be understood that after the reduced portions of the nuts are positioned in the outer ends of the elongated slots and the nuts are screwed farther down, said nuts will ride inwardly in said slots and cause the side braces to grip a tree or the like to force the same downwardly against the pointed end of bolt 12.

What I desire to claim is:

1. In a holder of the character described, a pair of detachably connected, angularly positioned base plates, a bolt for holding the same to each other, and means insuring the fixed relation of said base plates, said means comprising a protuberance struck from the body of each base plate, one of said protuberances snugly fitting within the other.

2. In a holder of the character described, a base plate, a side brace, and means for removably hinging said side brace upon said base plate, said means comprising a hook member projecting longitudinally from an end of said side brace, extending downwardly through an opening in said base plate and upwardly through a different opening in said base plate.

Signed at Bridgeport, in the county of Fairfield, and State of Connecticut, this 22nd day of April, A. D. 1921.

FRANK KARSCHITZ.